US008836781B2

(12) United States Patent
Hwang et al.

(10) Patent No.: US 8,836,781 B2
(45) Date of Patent: Sep. 16, 2014

(54) SYSTEM AND METHOD OF PROVIDING SURROUNDING INFORMATION OF VEHICLE

(75) Inventors: Jae Pil Hwang, Gyeonggi-do (KR); Sung Bo Sim, Gyeonggi-do (KR); Eui Yoon Chung, Seoul (KR)

(73) Assignee: Hyundai Motor Company, Seoul (KR)

( * ) Notice: Subject to any disclaimer, the term of this patent is extended or adjusted under 35 U.S.C. 154(b) by 337 days.

(21) Appl. No.: 13/323,617

(22) Filed: Dec. 12, 2011

(65) Prior Publication Data

US 2013/0063594 A1 Mar. 14, 2013

(30) Foreign Application Priority Data

Sep. 14, 2011 (KR) .................. 10-2011-0092576

(51) Int. Cl.
*H04N 7/18* (2006.01)
(52) U.S. Cl.
USPC .............. 348/139; 348/47; 348/48; 348/142; 348/147; 348/148; 348/149; 348/153; 348/159
(58) Field of Classification Search
CPC . H04N 5/2253; H04N 7/181; H04N 13/0242; H04N 5/2356; H04N 5/2254; B06K 37/06; B06K 2350/1024; B60S 1/0822; G01S 13/931; G01S 2013/9353; G01S 17/936; G01S 2013/9357
USPC ................. 348/139, 142, 147–149, 153, 159, 348/47–48
See application file for complete search history.

(56) References Cited

U.S. PATENT DOCUMENTS

| 8,654,196 | B2* | 2/2014 | Yokota .................. 348/139 |
| 2002/0047901 | A1* | 4/2002 | Nobori et al. .............. 348/149 |
| 2007/0165910 | A1 | 7/2007 | Nagaoka et al. |
| 2011/0211068 | A1* | 9/2011 | Yokota .................. 348/139 |
| 2011/0273565 | A1* | 11/2011 | Muramatsu et al. ........ 348/148 |
| 2012/0050496 | A1* | 3/2012 | Nishigaki .................. 348/49 |

FOREIGN PATENT DOCUMENTS

| JP | 2001076128 A | 3/2001 |
| JP | 2004-173048 A | 6/2004 |
| JP | 2007041791 A | 2/2007 |
| JP | 2007-193445 A | 8/2007 |
| JP | 2008-137426 A | 6/2008 |
| KR | 10-2007-0066660 | 6/2007 |
| KR | 10-0820310 | 4/2008 |

\* cited by examiner

*Primary Examiner* — Helen Shibru
(74) *Attorney, Agent, or Firm* — Edwards Wildman Palmer LLP; Peter F. Corless

(57) ABSTRACT

Technology for system and method of providing surrounding information of a vehicle which accurately calculates positions of obstacles around the vehicle is provided. The system includes a plurality of image acquisition units installed in the vehicle at a preset interval, an image acquisition unit selector which selects at least two image acquisition units of the plurality of image acquisition units and receives image data from the selected acquisition unit selector, and a control unit which recognizes an obstacle from the image data received from the image acquisition units, calculates a position of the obstacle, and controls the image acquisition unit selector to select the at least two image acquisition units of the plurality of image acquisition units according to information for vehicle speed of the vehicle.

16 Claims, 5 Drawing Sheets

SYSTEM AND METHOD OF PROVIDING SURROUNDING INFORMATION OF VEHICLE

CROSS-REFERENCES TO RELATED APPLICATIONS

The priority of Korean patent application No. 10-2011-0092576 filed on Sep. 14, 2011, the disclosure of which is hereby incorporated in its entirety by reference, is claimed.

BACKGROUND OF THE INVENTION

1. Field of the Invention

The present invention relates to system and method of providing surrounding information of a vehicle, and more particularly, to technology which accurately calculates positions of obstacles around a vehicle.

2. Description of the Related Art

In recent years, with highly intelligence of a vehicle, various intelligent functions are performed using various sensors installed in the vehicle. There are a forward collision avoidance system, an inter-vehicle maintenance system, or the like which detects forward obstacles or moving objects and prevents collision with obstacles or moving objects in advance.

In the related art, the forward obstacles or the moving objects and positions thereof are detected using a distance measuring sensor or an image sensor.

However, in the related method, there is a serious error in the detection result for the forward moving objects or the positions of the moving objects.

SUMMARY OF THE INVENTION

Various aspects of the present invention have been made in view of the above problems, and provide system and method of providing surrounding information of a vehicle which calculate moving objects around the vehicle or positions of the moving objects accurately.

According to an aspect of the present invention, a system of providing surrounding information of a vehicle is provided. The system may include a plurality of image acquisition units installed in the vehicle at a preset interval, an image acquisition unit selector which selects at least two image acquisition units of the plurality of image acquisition units and receives image data from the selected acquisition units, and a control unit which recognizes an obstacle from the image data received from the image acquisition unit selector, calculates a position of the obstacle, and controls the image acquisition unit selector to select the at least two image acquisition units of the plurality of image acquisition units according to information for vehicle speed of the vehicle.

The control unit may correct a position of the obstacle on image data of a main image acquisition unit among the plurality of image acquisition units based on the position of the obstacle.

The system may include a display unit which displays the image data corrected by the control unit on a screen.

The control unit may determine to increase a baseline when the vehicle speed is fast and to reduce the baseline when the vehicle speed is slow.

The control unit may control the image acquisition unit selector to select at least two image acquisition units having a first baseline when the vehicle is traveling at low speed, to select at least two image acquisition units having a second baseline longer than the first baseline when the vehicle is traveling at medium speed, and to select at least two image acquisition units having a third baseline longer than the second baseline.

The plurality of image acquisition units may be installed to have different baselines according to sequence.

The plurality of image acquisition units may be at least three.

The control unit may perform inter-vehicle distance control according the corrected image data.

The control unit may control the image acquisition unit selector to select at least two image acquisition units having a first baseline when the vehicle is traveling in an alley, to select at least two image acquisition units having a second baseline longer than the first baseline when the vehicle is traveling in a city, and to select at least two image acquisition units having a third baseline longer than the second baseline when the vehicle is traveling on a highway.

According to another aspect of the present invention, a method of providing surrounding information of a vehicle is provided. The method may include determining current vehicle speed of the vehicle, selecting at least two image acquisition units having a first baseline among a plurality of image acquisition units when the current vehicle speed is less than a preset first reference value, selecting at least image acquisition units having a second baseline longer than the first baseline among the plurality of image acquisition units when the current vehicle speed is less than a preset second reference value, selecting at least two image acquisition units having a third baseline longer than the second baseline among the plurality of image acquisition units when the current vehicle speed is greater than the preset second reference value, receiving image data from the selected at least two image acquisition units and performing image processing on the received image data, and recognizing an obstacle from the image-processed image data and calculating a position of the obstacle.

The method may further include correcting a position of the obstacle on image data acquired from a main image acquisition unit among the plurality of image acquisition units using the calculated position of the obstacle and displaying the corrected image data on a screen.

According to still another aspect of the present invention, a method of providing surrounding information of a vehicle is provided. The method may include variably determining a baseline according to vehicle speed, selecting at least two image acquisition units having the baseline among a plurality of image acquisition units, and calculating a position of an obstacle from image data received from the at least two image acquisition units.

The systems and methods of the present invention have other features and advantages which will be apparent from or are set forth in more detail in the accompanying drawings, which are incorporated herein, and the following Detailed Description of the Invention, which together serve to explain certain principles of the present invention

DETAILED DESCRIPTION

Figure 1:
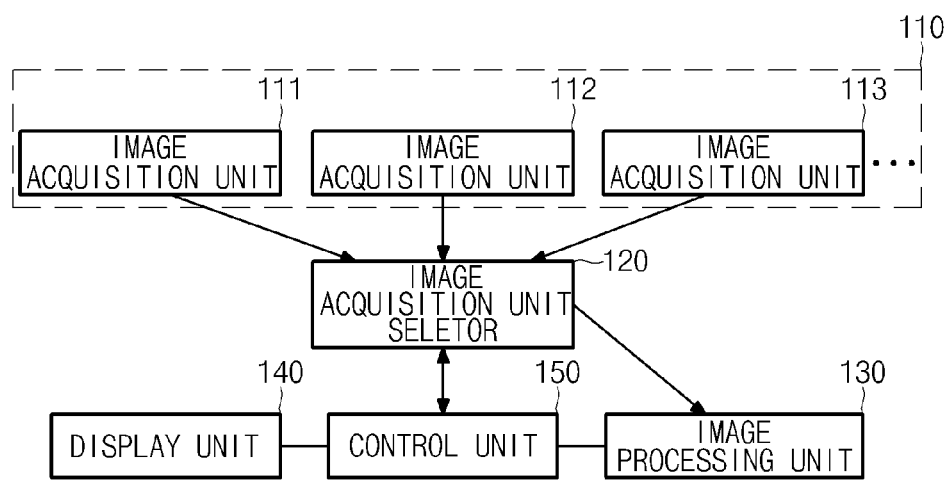
FIG. 1 is a configuration block diagram illustrating an exemplary system of providing surrounding information of a vehicle according to an illustrative embodiment of the present invention.

Reference will now be made in detail to various embodiments of the present invention(s), examples of which are illustrated in the accompanying drawings and described below. Like reference numerals in the drawings denote like elements. When it is determined that detailed description of a configuration or a function in the related disclosure interrupts understandings of embodiments in description of the embodiments of the invention, the detailed description will be omitted.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

FIG. 1 is a configuration diagram illustrating a system of providing surrounding information of a vehicle according to an exemplary embodiment of the present invention.

The system of providing surrounding information of a vehicle according to an exemplary embodiment of the present invention includes an image acquisition unit 110, an image acquisition unit selector 120, an image processing unit 130, a display unit 140, and a control unit 15.

The image acquisition unit 110 acquires image information of surrounding environment in front of a vehicle. The image acquisition unit 110 includes a main image acquisition unit 111 and a plurality of sub image acquisition units 112, 113, . . . . The image acquisition unit 110 includes a camera.

Figure 2:
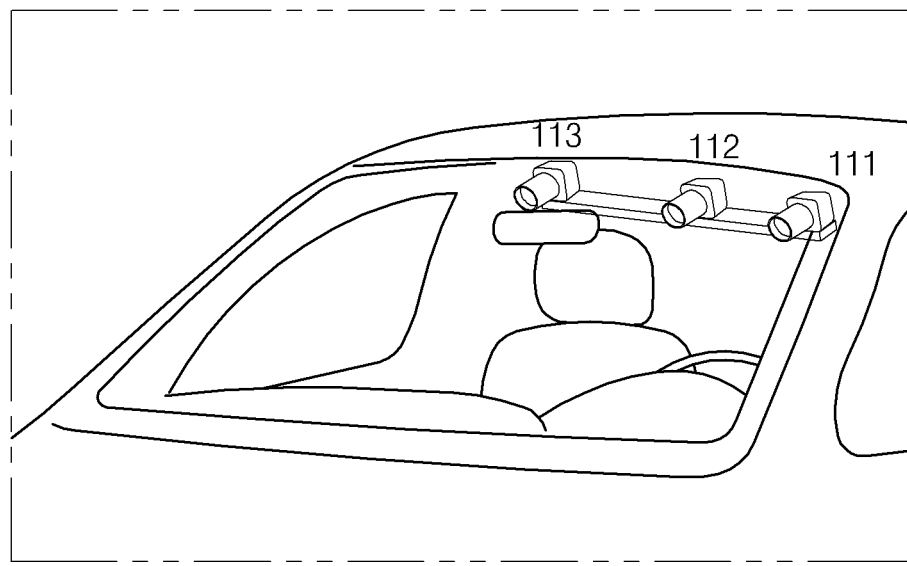
FIG. 2 is an illustrative diagram of a vehicle in which a plurality of image acquisition units of FIG. 1 are installed.
Figure 3:
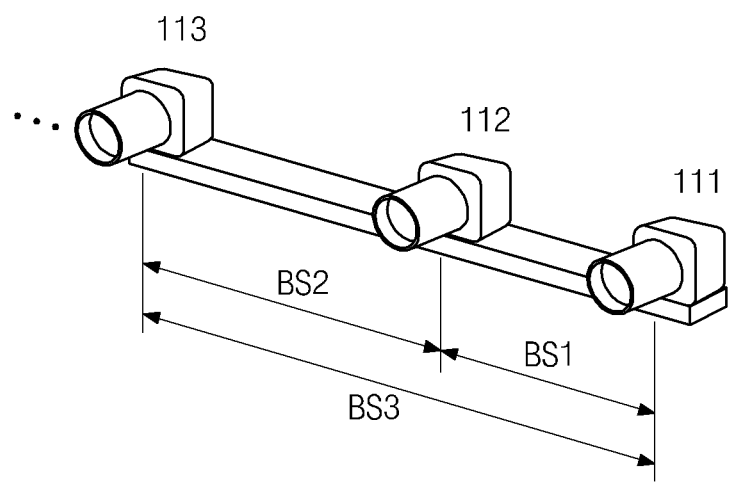
FIG. 3 is a diagram illustrating an optimum distance between image acquisition units when the plurality of image acquisition units are installed in the vehicle of FIG. 2.

As shown in FIG. 2, a plurality of image acquisition units 110 are arranged and installed at a preset interval above a front window of the vehicle. As the plurality of image acquisition unit 110, at least three cameras may be installed. At shown in FIG. 3, the preset interval denotes a first baseline, a second baseline, and a third baseline. The first to third baselines have asymmetric values through sequence (geometric progression sequence, equivalent sequence). That is, the first to third baselines are configured to have different values from one another and set to increase in order of BS1, BS2, and BS3. Lengths of the baselines between the image acquisition units 111 to 113 may be variously combined by the asymmetry. FIGS. 2 and 3 have illustrated the case where three image acquisition units 111 to 113 are installed, but present invention is not limited thereto. When the number of the acquisition units 110 becomes higher, the lengths of the baselines may be variously set.

The first baseline denotes an interval BS1 between the main image acquisition unit 111 and the sub image acquisition unit 112, the second baseline denotes an interval BS2 between the sub image acquisition units 112 and 113, and the third baseline denotes an interval BS3 between the main image acquisition unit 111 and the sub image acquisition unit 113.

The image acquisition unit selector 120 is controlled by the control unit 150 to select two image acquisition units among the image acquisition units 111 to 113, receives image data from the selected image acquisition units, and transmits the received image data to the image processing unit 130.

The image processing unit 130 generates displacement image data from the image data received from the image acquisition unit selector 120. At this time, the displacement image data denotes data in which overlapping pixels remove among two images received from the two image acquisition units and the two images in which the overlapping pixels are removed are processed as one stereo image.

The control 150 detects a moving object from the displacement image data received from the image processing unit 130 and analyzes a position (distance) of the moving object. Further, the control unit 150 corrects the analyzed position of the moving object in the image data imaged by the main image acquisition unit 111 and transmits the corrected image data to the display unit 140.

The display unit 140 displays the image data acquired by the main image acquisition unit 111. That is, the display unit 140 displays the image data corrected by the control unit 150 on a screen. Even when the image acquisition unit selected by the vehicle speed is changed, the image data imaged by the selected image acquisition unit is not provided. Specifically, while the image data imaged by the main image acquisition unit 111 is basically provided, the image data imaged by the main image acquisition unit 111 is corrected based on the calculated position of the moving object and the corrected image data is provided to the display unit 140 whenever the image acquisition unit selected according to the vehicle speed is changed. Therefore, the position information of the moving object is accurately detected and a continuous screen is provided without changing a basic screen, thereby improving a driver's convenience. For example, the sub image acquisition units 112 and 113 are arranged in different positions and directions and thus an angle and position of the images acquired from the sub image acquisition units 112 and 113 viewed from a driver are slightly different although the sub image acquisition units 112 and 113 images the same environment. Thereby, when the image of the selected image acquisition unit is provided, the angle and position continuously changed and thus the driver is feeling tired. However, in the present invention, while the image of the main image acquisition unit 111 is basically displayed consistently, the position of the moving object in the image of the main image acquisition unit 111 is corrected based on the position information calculated from the selected image acquisition unit. Therefore, it is possible to minimize the driver's fatigue.

On the other hand, the control unit 150 controls the image acquisition unit selector 120 to select two image acquisition units of the plurality of image acquisition units 111 to 113 according to vehicle speed information. Although not shown, the vehicle speed information may be collected through a transmission, a navigation, or the like. A method of selecting two image acquisition units among the plurality of image acquisition units 111 to 113 will be described with reference to the following Table 1.

TABLE 1

| Speed interval | Distance to a point of interest | Baseline | Camera selection |
|---|---|---|---|
| Slow speed (alley) travelling | 20 m or less | BS1 (20 cm) | Image acquisition units 111, 112 |

TABLE 1-continued

| Speed interval | Distance to a point of interest | Baseline | Camera selection |
|---|---|---|---|
| Medium speed (city) travelling | 21 to 50 m | BS2 (40 cm) | Image acquisition units 112, 113 |
| High speed (highway) travelling | 51 to 150 m | BS3 (60 cm) | Image acquisition units 111, 113 |

In Table 1, it is assumed that the baselines demote distances between the image acquisition units as shown in FIG. 3 and lengths of the baselines are longer in order of BS1, BS2, and BS3, that is, BS1<BS2<Bs3.

Figure 4:
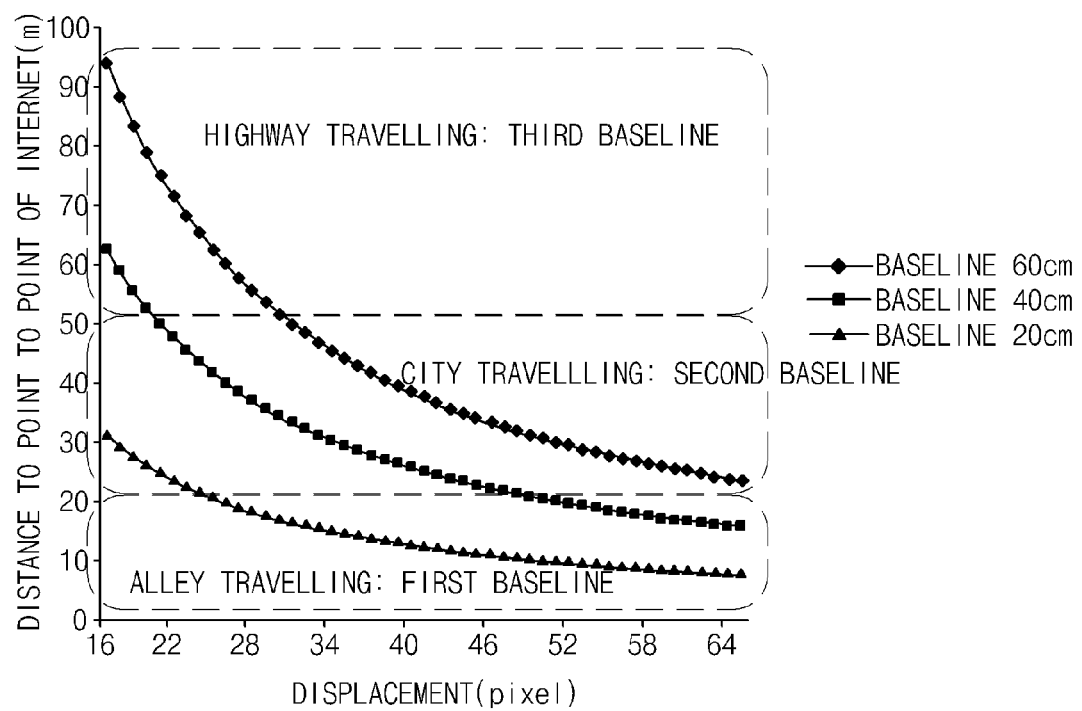
FIG. 4 is a graph representing a measuring distance for each displacement with respect to a length of a baseline.

As shown in the graph of FIG. 4, when the vertical axis represents a distance to a point of interest and the horizontal axis represents displacement, the relationship of the baseline with respect to the distance of a point of interest and the displacement is inversely proportional. With increase in the baseline, the relationship of the baseline with respect to the distance of a point of interest and the displacement is linear. Here, the displacement denotes the number of pixels between the moving objects on the image data received from two image acquisition units. In FIG. 4, with increase in the distance to a point of interest, an error in distance measurement for each displacement is increased. When the baseline is too long, the displacement of the moving object within a short distance is significantly out of an effective value.

The longer the baseline is, the more reduced the error in the distance measurement is. However, when the image data received from the two image acquisition units is processed as one stereo image data, the amount of image processing is increased. On the other hand, the shorter the baseline is, the more increased the error in the distance measurement is and the more reduced the amount of image processing is. Thus, since the probability of error is low when traveling at low speed with the distance to a point of interest being short, the control unit 150 allows an image acquisition unit having a short baseline to be selected, thereby reducing the amount of image processing. Since the probability of error is high when traveling at high speed with the distance to a point of interest being long, the control unit 150 allows an image acquisition unit having a long baseline to be selected, thereby reducing the probability of error regardless of the large amount of image processing.

For example, when a difference of distinguishable displacement is designated to 16 to 64 pixels in a 640*480 camera having a focal distance of 25 mm, an image acquisition unit will be selected as follows.

First, when traveling at low speed, the distance to a point of interest is 20 m or less and thus the control unit 150 controls the image acquisition unit selector 120 to select the image acquisition units 111 and 112 having the short baseline BS1.

When traveling at medium speed, the distance to a point of interest is in a range of 21 to 50 m and thus the control unit 150 controls the image acquisition unit selector 120 to select the image acquisition units 112 and 113 having the medium baseline BS2.

When traveling at high speed, the distance to a point of interest is in a range of 51 to 150 m and thus the control unit 150 controls the image acquisition unit selector 120 to select the image acquisition units 111 and 113 having the long baseline BS3.

In the present invention, since the viewing distance is long at high speed traveling and thus the probability of error is high, the baseline is set to be long regardless of a large amount of image processing. Since the viewing distance is short at low-speed traveling and thus the probability of error is low, the baseline is set to be short.

In the present invention, the interval between the image acquisition units 111 to 113 may be selected in accordance with the distance of each baseline using various lengths of the baselines so that since it is unnecessary to move the image acquisition units for variation of the baseline, it is possible to reduce occurrence of error in calibration due to moving of the image acquisition units themselves.

Figure 5:
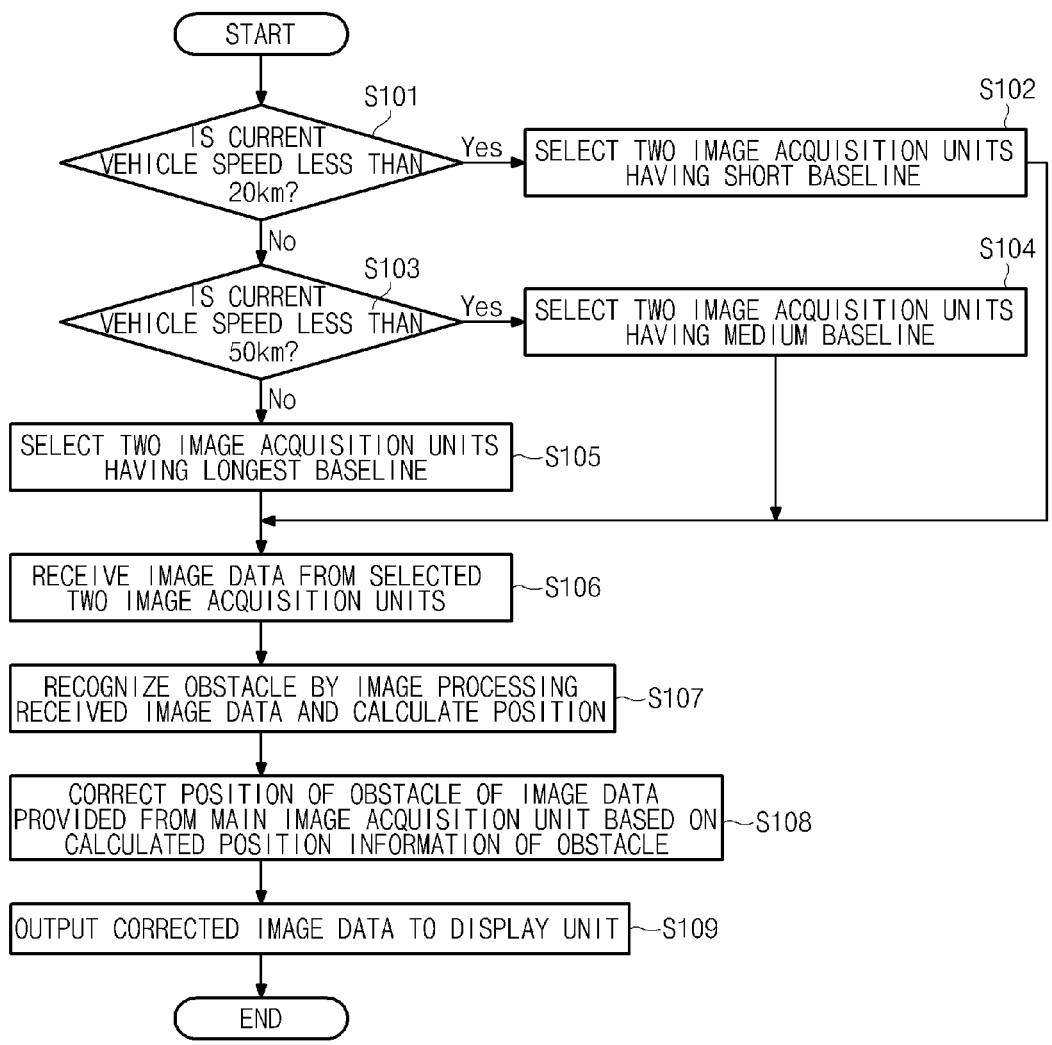
FIG. 5 is a sequence diagram illustrating an exemplary method of providing surrounding information of a vehicle according to an illustrative embodiment of the present invention.

Hereinafter, a method of providing surrounding information according to an exemplary embodiment will be described with reference to FIGS. 3 to 5.

First, the control unit 150 determines whether or not current vehicle speed is less than 20 km (S101). When the current vehicle speed is less than 20 km, the control unit 150 controls the image acquisition unit selector 120 to select two image acquisition units 111 and 112 having a short baseline (S102).

When the current vehicle speed is not less than 20 km, the control unit 150 determines whether or not the current vehicle speed is less than 50 km (S103). When the current vehicle speed is less than 50 km, the control unit 150 controls the image acquisition unit selector 120 to select two image acquisition units 112 and 113 having a medium baseline (S104).

Hereafter, when the current vehicle speed is greater than 50 km, the control unit 150 controls the image acquisition unit selector 120 to select two image acquisition units 111 and 113 having the longest baseline (S105).

The image acquisition unit selector 120 receives image data from the selected two image acquisition units and transmits the received image data to the image processing unit 130 (S106). The image processing unit 130 performs image processing on the received two pieces of image data. The control unit 150 recognizes an obstacle from the image-processed image data and calculates a position of the obstacle (S107).

Next, the control unit 150 corrects a position of the obstacle on image data provided by the main image acquisition unit 111 based on the calculated position information of the obstacle (S108). The control unit 150 outputs the corrected image data to the display unit 140 (S109).

As described above, in the present invention, the plurality of cameras are installed and distances (baselines) between the cameras are set through sequence to create various baselines. Therefore, it is possible to solve the problem in which the length of the baseline is fixed due to characteristic of a stereo camera and thus accuracy of a measurable distance is fixed and the problem in which parameters on a camera axis are changed when a baseline-variable type camera is installed and to improve accuracy of a measuring result in various distances.

That is, when the baseline is fixed, as the obstacle is in a long distance, a measuring error range is increased. On the contrary, as the obstacle is in a short distance, since the obstacle is viewed by one side of the camera, it is impossible to accurately measure a position according to the distance. However, the present invention variably uses the baseline to solve the problems.

Further, the present invention do not move the image acquisition units 110 to variably use the baseline, but the present invention fixes the plurality of image acquisition units 110 and selects two image acquisition units of the plurality of image acquisition units 110 to be combined into different baselines. Therefore, the present invention fixes and installs the image acquisition units 110 to variably use the baselines.

Thus, the present invention recognizes an obstacle in front of the vehicle using stereo image data to detect the distance to the obstacle accurately so that it is possible to perform various vehicle controls such as inter-vehicle control or vehicle control using accurate distance information.

Further, the present invention calculates the position of the obstacle accurately to minimize occurrence of abrupt behaviour of the vehicle due to an error in the distance, thereby improve a driver's convenience.

According to the present invention, the system of providing surrounding information of a vehicle provides accurate position information for a surface of a road and surrounding moving objects to improve a driver's safety and convenience.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A system of providing surrounding information of a vehicle, the system comprising:
    a plurality of image acquisition units installed in the vehicle at a preset interval, wherein each of the plurality of image acquisition units have different baseline lengths;
    an image acquisition unit selector which selects at least two image acquisition units of the plurality of image acquisition units and receives image data from the selected acquisition units; and
    a control unit which recognizes an obstacle from the image data received from the image acquisition unit selector, calculates a position of the obstacle, and controls the image acquisition unit selector to select the at least two image acquisition units of the plurality of image acquisition units having a baseline corresponding to vehicle speed information.

2. The system according to claim 1, wherein the control unit corrects a position of the obstacle on image data of a main image acquisition unit among the plurality of image acquisition units based on the position of the obstacle.

3. The system according to claim 2, further comprising a display unit which displays the image data corrected by the control unit on a screen.

4. The system according to claim 1, wherein the control unit determines to increase a baseline when the vehicle speed is fast and to reduce the baseline when the vehicle speed is slow.

5. The system according to claim 1, the control unit controls the image acquisition unit selector to select at least two image acquisition units having a first baseline when the vehicle is traveling at low speed, to select at least two image acquisition units having a second baseline longer than the first baseline when the vehicle is traveling at medium speed, and to select at least two image acquisition units having a third baseline longer than the second baseline.

6. The system according to claim 1, wherein the plurality of image acquisition units are installed to have different baselines according to sequence.

7. The system according to claim 1, wherein the plurality of image acquisition units are at least three.

8. The system according to claim 2, wherein the control unit performs inter-vehicle distance control according the corrected image data.

9. The system according to claim 1, wherein the control unit controls the image acquisition unit selector to select at least two image acquisition units having a first baseline when the vehicle is traveling in an alley, to select at least two image acquisition units having a second baseline longer than the first baseline when the vehicle is traveling in a city, and to select at least two image acquisition units having a third baseline longer than the second baseline when the vehicle is traveling on a highway.

10. A method of providing surrounding information of a vehicle, the method comprising:
    determining current vehicle speed of the vehicle;
    selecting at least two image acquisition units having a first baseline among a plurality of image acquisition units when the current vehicle speed is less than a preset first reference value;
    selecting at least image acquisition units having a second baseline longer than the first baseline among the plurality of image acquisition units when the current vehicle speed is less than a preset second reference value;
    selecting at least two image acquisition units having a third baseline longer than the second baseline among the plurality of image acquisition units when the current vehicle speed is greater than the preset second reference value;
    receiving image data from the selected at least two image acquisition units and performing image processing on the received image data; and
    recognizing an obstacle from the image-processed image data and calculating a position of the obstacle.

11. The method according to claim 10, further comprising:
    correcting a position of the obstacle on image data acquired from a main image acquisition unit among the plurality of image acquisition units using the calculated position of the obstacle; and
    displaying the corrected image data on a screen.

12. The method according to claim 10, wherein the baselines are set by sequence.

13. The method according to claim 10, wherein the plurality of image acquisition units are at least three.

14. A method of providing surrounding information of a vehicle, the method comprising:
    variably determining a baseline according to vehicle speed;
    selecting at least two image acquisition units among a plurality of image acquisition units that have the determined baseline that corresponds to the vehicle speed, wherein each of plurality of image acquisition units have a different baseline length; and
    calculating a position of an obstacle from image data received from the at least two image acquisition units.

15. The method according to claim 14, wherein the variably determining the baseline according to the vehicle speed includes determining to increase the baseline when the vehicle speed is fast and determining to reduce the baseline when the vehicle speed is slow.

16. The method according to claim 14, wherein the plurality of image acquisition units are at least three.

* * * * *